(12) United States Patent
Raynauld et al.

(10) Patent No.: US 6,456,912 B1
(45) Date of Patent: Sep. 24, 2002

(54) METHOD AND SYSTEM FOR INDEPENDENT CONTROL OF A VARIABLE FORCE DAMPER SYSTEM

(75) Inventors: Olivier Raynauld, Senlis (FR); David J. Barta, Dayton; David Andrew Shal, Bellbrook, both of OH (US); Alexander Apostolos, Kronberg (DE); Olivier Valee, Paris (FR); Darin Duane Delinger, Tipp City, OH (US); Albert Victor Fratini, Evanston, IL (US); Chinh Trong Nguyen, Pittsburgh, PA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/849,026

(22) Filed: May 4, 2001

(51) Int. Cl.[7] .................................................. G06F 7/00
(52) U.S. Cl. .............................. 701/37; 701/38; 280/5.5
(58) Field of Search .............................. 701/37, 38, 1; 280/5.5, 5.502, 5.507, 5.515; 180/337

(56) References Cited

U.S. PATENT DOCUMENTS

| | | |
|---|---|---|
| 5,062,657 A | 11/1991 | Majeed |
| 5,062,658 A | 11/1991 | Majeed |
| 5,071,157 A | 12/1991 | Majeed |
| 5,096,219 A | 3/1992 | Hanson et al. |
| 5,235,529 A | 8/1993 | Hanson et al. |
| 5,570,288 A | 10/1996 | Badenoch et al. |
| 5,570,289 A | 10/1996 | Stacey et al. |
| 5,606,503 A | 2/1997 | Shal et al. |
| 6,058,340 A * | 5/2000 | Uchigama et al. ............ 701/37 |
| 6,314,353 B1 * | 11/2001 | Ohsaku et al. ............... 701/37 |
| 6,338,014 B2 * | 1/2002 | Hegring et al. .............. 280/5.5 |
| 6,055,471 A1 * | 4/2002 | Ohsaku et al. ............... 280/5.5 |

* cited by examiner

Primary Examiner—Richard M. Camby
(74) Attorney, Agent, or Firm—Scott A. McBain (57) ABSTRACT

A method, system and computer readable medium storing a computer program is provided for independent control of a variable force damper system. The variable force damper system can be applied to control a vehicle suspension system. The system provides individual wheel control independent of vehicle body forces. In operation, at least one relative velocity signal and at least one body demand force is received. At least one body damper command is determined based on the body demand force. At least one wheel motion indicating parameter is determined based on the relative velocity signal. At least one wheel damper command is determined based on the wheel motion indicating parameter and a damper command is determined based on the larger of the body damper command and the wheel damper command.

22 Claims, 7 Drawing Sheets

METHOD AND SYSTEM FOR INDEPENDENT CONTROL OF A VARIABLE FORCE DAMPER SYSTEM

TECHNICAL FIELD OF THE INVENTION

In general, the invention relates to controlled vehicle suspension systems. More specifically, the invention relates to coefficients of force being offset through suspension damping, and in particular, to a method and system for providing individual wheel control independent of vehicle body forces, for use with suspension damping control outputs.

BACKGROUND OF THE INVENTION

Known variable force suspension systems include variable force shock absorbers and/or struts that provide suspension-damping forces at a magnitude controllable in response to commands provided by a suspension system controller. Some systems provide control between two damping states and others provide continuously variable control of damping force.

In a known manner of control of a variable force suspension, the demand force for each variable force damper is determined responsive to a set of gains, the wheel vertical velocity and the body heave, roll and pitch velocities. An example system determines the demand force as follows: $DF = G_h H' + G_r R' + G_p P' + G_w v$, where DF is the demand force, $G_h$ is the heave gain, $G_r$ is the roll gain, $G_p$ is the pitch gain, $G_w$ is the wheel velocity gain, H' is the body heave velocity, R' is the body roll velocity, P' is the body pitch velocity and v is the wheel vertical velocity. The portion of the demand force computation $G_h H' + G_r R' + G_p P'$, represents the body component determined responsive to the body heave, roll, and pitch velocities. The portion of the demand force computation $G_w v$ represents the wheel component determined responsive to the difference between the computed body corner velocity and the body-wheel relative velocity.

A control signal representing the determined demand force is output to control the variable force damper responsive to the demand force. Example variable force damper systems are described in U.S. Pat. Nos. 5,235,529; 5,096,219; 5,071,157; 5,062,657 and 5,062,658. As previously mentioned, current variable force damper systems require both body and wheel input variables to compute the wheel component demand force. Due to the necessity to use both body and wheel input variables, it is difficult for current variable force damper systems to obtain acceptable levels of wheel control without creating undesirable effects on other aspects of a vehicles ride comfort.

Modules are typically used by the variable force damper systems for identifying and controlling the different aspects of automotive control including the body and wheel components. The modules typically use specialized algorithms designed for interpreting the automobiles input forces for a preferred control signal. One module known in the art commands individual damper outputs to a minimum damping state whenever the applicable desired force and damper wheel to body velocity signals are opposite in sign (a state in which the given damper is said to be in an "active" quadrant). Within the limits of damper travel for small to medium-sized inputs, this approach provides acceptable vehicle body motion control. However, this strategy is insufficient by itself to provide acceptable levels of wheel resonance control.

Therefore, it would be desirable to have a method and system that would improve upon the above-mentioned situation, and related situations in which variable force damper control is reliant on both body and wheel input variables. Such an algorithm may provide superior gross motion control and reduced wheel hop. Ideally, the algorithm would improve body and wheel control with minimal if any sacrifice in the vehicles ride comfort and safety.

SUMMARY OF THE INVENTION

One aspect of the invention provides a method for controlling a variable force damper system, including receiving at least one relative velocity signal. At least one body demand force is received. At least one body damper command based on the body demand force is received. At least one wheel motion indicating parameter based on the relative velocity signal is determined. At least one wheel damper command based on the wheel motion indicating parameter is determined and a damper command based on the larger of the body damper command and the wheel damper command is determined.

Other aspects of the invention provide a method where the wheel frequency isolation filter includes a digital band-pass filter. The digital band-pass filter can include a low-pass filter, and a high-pass filter. A slew rate limited can be applied to the wheel damper command. The wheel damper command can be determined by a lookup-table function. The lookup-table function can be based on a linear interpolation function. The lookup-table function can be based on a standard interpolation function. The lookup-table function can be a based on an inherent interpolation function.

Another aspect of the invention provides a method for controlling a variable force damper system, including determining an active quadrant flag based on a supplied body demand force and a supplied relative velocity signal wherein the active quadrant flag may be active or passive. A first body damper command can be determined based on the supplied body demand force. A second body damper command can be determined based on the active quadrant flag wherein the second body damper command is equal to zero when the active quadrant flag is active. The second body damper command can be determined based on the active quadrant flag wherein the second body damper command is equal to the first body damper command when the active quadrant flag is passive. A second wheel damper command can be determined based on the active quadrant flag wherein the second wheel damper command is equal to a function of a supplied wheel damper command and the first body damper command when the active quadrant flag is active and the second wheel damper command can be determined based on the active quadrant flag wherein the second wheel damper command is equal to the supplied wheel damper command when the active quadrant flag is passive.

Other aspects of the present invention provide a method where the determining of the second wheel damper command further includes subtracting the first body damper command multiplied by a pre-defined scaler from the supplied wheel damper command when the active quadrant flag is active and setting the second wheel damper command to equal zero when the second wheel damper command is less than zero.

Another aspect of the present invention provides a method for controlling a variable force damper system, including receiving at least one relative velocity signal. At least one body demand force is received. A body demand force power signal is determined as the product of the body demand force and the relative velocity signal. A body control active quadrant flag responsive to the body demand force power signal is determined wherein the body control active quadrant flag may be active or passive. A body damper command is determined responsive to the body demand force when the body control active quadrant flag is passive, and zero otherwise.

Other aspects of the present invention provide a method in which the body control active quadrant flag is set to active when the body demand force signal is less than a first pre-defined value and set to passive when the body demand force power signal is greater than a second pre-defined value.

Another aspect of the present invention provides a system for controlling a variable force damper system, including a means for receiving at least one relative velocity signal, means for receiving at least one body demand force, means for determining at least one body damper command based on the body demand force, means for determining at least one wheel motion indicating parameter based on the relative velocity signal, means for determining at least one wheel damper command based on the wheel motion indicating parameter; and means for determining a damper command based on the larger of the body damper command and the wheel damper command.

Another aspect of the present invention provides a day system for controlling a variable force damper system, including means for determining an active quadrant flag based on a supplied body demand force and a supplied relative velocity signal wherein the active quadrant flag may be active or passive, means for determining a first body damper command based on the supplied body demand force, means for determining a second body damper command based on the active quadrant flag wherein the second body damper command is equal to zero when the active quadrant flag is active, means for determining the second body damper command based on the active quadrant flag wherein the second body damper command is equal to the supplied body damper command when the active quadrant flag is passive, means for determining a second wheel damper command based on the active quadrant flag wherein the second wheel damper command is equal to a function of a supplied wheel damper command and the first body damper command when the active quadrant flag is active, and means for determining the second wheel damper command based on the active quadrant flag wherein the second wheel damper command is equal to the supplied wheel damper command when the active quadrant flag is passive.

Other aspects of the present invention include a system wherein the means for determining the second wheel damper command further includes means for subtracting the first body damper command multiplied by a pre-defined scaler from the first wheel damper command when the active quadrant flag is active, and means for setting the second wheel damper command to equal zero when the second wheel damper command is less than zero.

Another aspect of the present invention provides a system for controlling a variable force damper system, including means for receiving at least one relative velocity signal, means for receiving at least one body demand force, means for determining a body demand force power signal as the product of the body demand force and the relative velocity signal, means for determining a body control active quadrant flag responsive to the body demand force power signal wherein the body control active quadrant flag may be active or passive, means for determining a body damper command responsive to the body demand force when the body control active quadrant flag is not set, and zero otherwise.

Another aspect of the present invention provides a computer readable medium storing a computer program including computer readable code for receiving at least one relative velocity signal, computer readable code for receiving at least one body demand force, computer readable code for determining at least one body damper command based on the body demand force, computer readable code for determining at least one wheel motion indicating parameter based on the relative velocity signal, computer readable code for determining at least one wheel damper command based on the wheel motion indicating parameter, and computer readable code for determining a damper command based on the larger of the body damper command and the wheel damper command.

Another aspect of the present invention provides a computer readable medium storing a computer program includes computer readable code for determining an active quadrant flag based on a supplied body demand force and a supplied relative velocity signal wherein the active quadrant flag may be active or passive, computer readable code for determining a first body damper command based on the supplied body demand force, computer readable code for determining a second body damper command based on the active quadrant flag wherein the second body damper command is equal to zero when the active quadrant flag is active computer readable code for determining the second body damper command based on the active quadrant flag wherein the second body damper command is equal to the first body damper command when the active quadrant flag is passive, computer readable code for determining a second wheel damper command based on the active quadrant flag wherein the second wheel damper command is equal to a function of a supplied wheel damper command and the first body damper command when the active quadrant flag is active, and computer readable code for determining the second wheel damper command based on the active quadrant flag wherein the second wheel damper command is equal to the supplied wheel damper command when the active quadrant flag is passive.

Other aspects of the present invention include computer readable medium where the computer readable code for determining the second wheel damper command further includes computer readable code for subtracting the first body damper command multiplied by a pre-defined scaler from the supplied wheel damper command when the active quadrant flag is active and computer readable code for setting the second wheel damper command to equal zero when the supplied wheel damper command is less than zero.

Another aspect of the present invention includes computer readable medium storing a computer program including computer readable code for receiving at least one relative velocity signal, computer readable code for receiving at least one body demand force, computer readable code for determining a body demand force power signal as the product of the body demand force and the relative velocity signal, computer readable code for determining a body control active quadrant flag responsive to the body demand force power signal, computer readable code for determining a body damper command responsive to the body demand force when the body control active quadrant flag is passive, and zero otherwise.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

Figure 1:
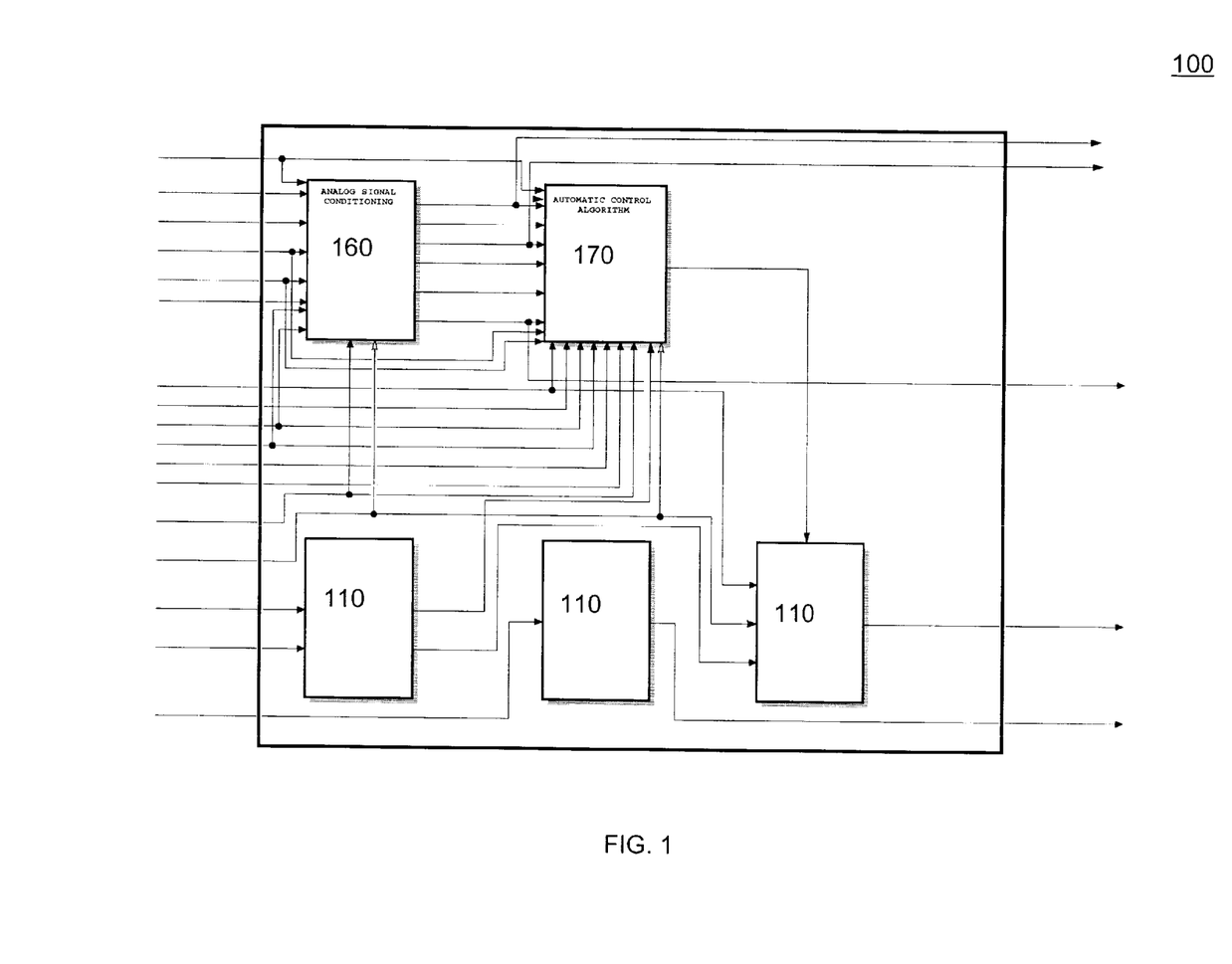
FIG. 1 is a block diagram of one embodiment of a continuously variable real-time damping control algorithm in accordance with the invention.

Many types of variable force damping systems are known to the art, however none have the ability to apply body and wheel control independently, as does one embodiment of the invention. FIG. 1 illustrates one embodiment of a control algorithm for a variable force damping system known in the art as a CVRTD (continuously variable real-time damping). The CVRTD control algorithm 100 utilizes independent body and wheel control algorithms, in accordance with the invention. An additional embodiment of the invention may utilize the variable force damping systems as described in U.S. Pat. Nos. 5,570,289, 5,570,288, and 5,606,503 in whole or in part, and are herein incorporated by reference. The additional algorithms 110 of the CVRTD control algorithm 100, as well as specified embodiments of the invention yet to be mentioned may be described in the previously referenced patents. Two elements of the CVRTD control algorithm 100 are within the scope of the present invention, an analog signal conditioning algorithm 160, and an automatic control algorithm 170. For one embodiment of the invention the analog signal conditioning algorithm 160 can determine a relative velocity signal filtered to reduce the body frequency content. Additional embodiments of the invention may also require the automatic control algorithm 170. The automatic control algorithm 170 can determine a quadrant state that provides improved functionality, and can determine a wheel damper control signal which may further integrate the improvements of the separated demand forces, and the quadrant state. In all embodiments of the invention, actuator-controlling signals are described as PWM (Pulse Width Modulation) signals; however, actuators of another type not based on PWM signals can be substituted in alternative embodiments, therefore "PWM" and "pulse width modulation" is in reference to one embodiment of the invention and the use of their names may be considered as generic. Further, In addition, it will be recognized that the use of the terms "algorithm" and "module" may be used interchangeably throughout the detailed description of the invention. These terms may be used for nomenclature clarity only, and are not intended to restrict the invention in any way.

Figure 2:
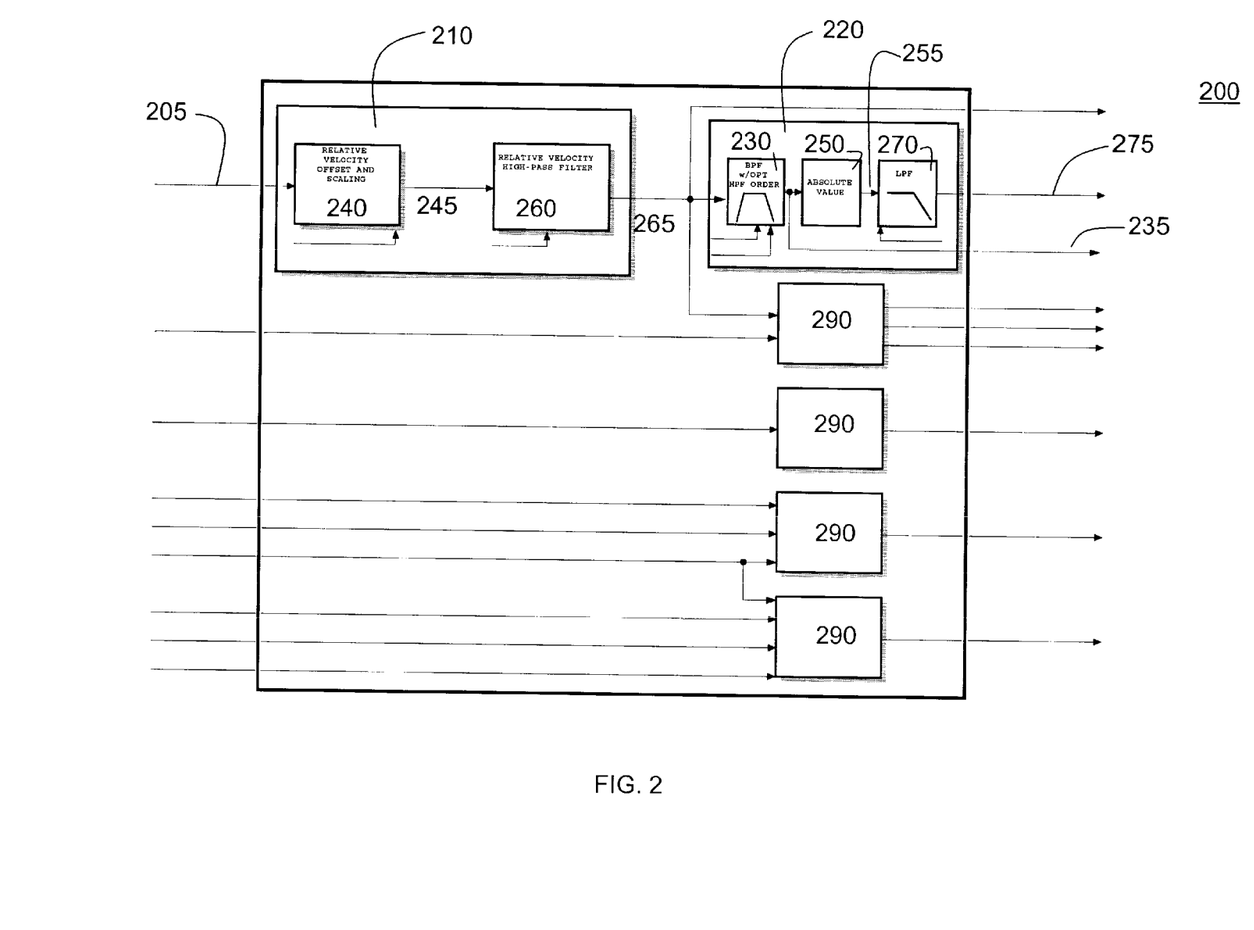
FIG. 2 is a block diagram of one embodiment of an analog signal conditioning algorithm imbedded in the continuously variable real-time damping control algorithm of FIG. 1.

In FIG. 2, an analog signal conditioning algorithm 200 provides further detail of an embodiment of the analog signal conditioning algorithm 160. The analog signal conditioning algorithm 200 may contain a corner relative velocity determination algorithm 210, and a corner average wheel velocity determination algorithm 220. The analog signal conditioning algorithm 200 may additionally contain embodiments or algorithms 290, detailed in the previously referenced patents.

The corner relative velocity determination algorithm 210 can determine various measures of a sprung mass to unsprung mass relative velocity, as a function of a relative velocity or adjusted relative velocity signals 205 provided as input for this embodiment from at least one vehicle velocity sensor (sensor). In another embodiment of the invention, the relative velocity signal may be a function of a wheel and a corresponding corner of a vehicle body. Further embodiments may provide relative velocity signals from alterative sources and locations. The corner relative velocity determination algorithm 210 may contain a relative velocity offset and scaling algorithm 240, and a relative velocity high-pass filter 260. In one embodiment of the invention, the relative velocity offset and scaling algorithm 240 may receive the relative velocity signals 205. The relative velocity offset and scaling algorithm 240 may then multiply or "scale" the adjusted relative velocity signals 205. This operation can be performed separately for each of the four corners, thereby producing a left front (LF) through right rear (RR) scaled relative velocity signals 245 as output.

The relative velocity high-pass filter 260 may receive the LF through RR scaled relative velocity signals 245 and may subject them to a single-pole, infinite impulse response (IIR) digital high-pass filter (HPF) to create the corresponding high-pass filtered relative velocity outputs 265. For one embodiment of the invention, this operation may be necessary to attenuate the DC-bias that might otherwise exist as a result of a differentiator offset voltage not being exactly equal to a predetermined voltage. The LF through RR high-pass filtered relative velocity signals 265 can be treated as signed, 16-bit numbers with a range of +/−2.0 meters per second (m/s). An embodiment of the relative velocity high-pass filter 260 may be implemented using the following transfer function:

$$H_Z = \frac{1 - z^{-1}}{1 - B_1 z^{-1}},$$

where $H_z$ may be a discrete, or 'z', domain transfer function relating the z-transform of the filter output to that of the filter input, and B1 may be the EEPROM high-pass filter calibration.

An embodiment of the desired high-pass filter transfer function may be implemented using 16-bit operands as $Y_k = B_1 Y(k-1) + X_k - X(k-1)$, where $B_1$ can be a 16-bit fractional (Q15) filter constant, $Y_k$ can be a filter output, Y(k−1) can be a previous filter output, $X_k$ can be a filter input, and X(k−1) can be a previous filter input.

All arithmetic steps in the execution of the relative velocity high-pass filter 260 may be checked for overflow conditions, with saturation forced as appropriate. Where possible, the arithmetic steps can be sequenced to prevent intermediate variables from being allowed to clip at either limit, in a manner known in the art.

The output high-pass filtered relative velocity signals 265 may be provided to the corner average wheel velocity determination algorithm 220. The output LF through RR high-pass filtered relative velocity signals 265 may be processed through a set of equations and filters designed to first isolate and then determine the average amplitude of a wheel-hop frequency and its components using a wheel frequency isolation filter 230.

In one embodiment of the invention, three steps may be required in order to determine an average wheel velocity signal 275 for each corner from the associated high-pass filtered relative velocity. The steps are as follows:

1). The high-pass filtered relative velocity signal 265 can be filtered to allow attenuation of low-frequency body motion content and high-frequency road inputs. For one embodiment, a band-pass filter (a combination of a first-order low-pass filter and a first- or second-order high-pass filter) may be used as the wheel frequency isolation filter 230 to achieve attenuation of low-frequency body motion content and high-frequency road inputs, while additionally maintaining the desired signal phase characteristics. Further embodiments of the invention may use alternative filtering solutions to achieve equal or similar results. The relative velocity high-pass filter 260 described previously may function only to remove a DC-offset, which can otherwise exist.

2). The absolute value is taken of the result of step #1.

3). The result of step #2 is low-pass filtered, with the intent to identify the average (or DC) value of the absolute-valued signal, while rejecting the ripple which exists at double the wheel-hop frequency, as is known in the art.

One embodiment of the first step may subject the high-pass filtered relative velocity signals 265 to the band pass filter 230 to create a band pass filtered wheel velocity signal for each of the four corners. The filter can be designed to attenuate the body frequency components, while passing (or attenuating significantly less) the wheel-hop frequency components. Additionally, the high-pass filtered relative velocity signals 265 may be used by alternative embodiments as a relative velocity signal. For one embodiment of the invention, the band pass filter 230 may be comprised of a single-pole low-pass filter (LPF) in series with a single-pole high-pass filter (HPF). Another embodiment of the invention provides that the band pass filter 230 may be comprised of a double-pole high-pass filter (HPF). Further, an embodiment of the band pass filter 230 may calibrate the HPF order, where a first-order filter structure may be executed once or twice, based on the status of a calibration function enable flag. The signals that result from these high-pass filtering operations can be referred to as a LF, RF, LR and RR band-pass filtered relative velocity signals 235 (band-pass filtered relative velocity signal) or wheel demand force signal (wheel motion indicating perimeter), and may be performed separately for each of the four corners.

High-pass filtered relative velocities 265 can be subjected to a single-pole, infinite impulse response (IIR), digital low-pass filter as the first step in determining the band-pass filtered relative velocity signals (filtered relative velocity signals) 235. This operation may be performed separately for each of the four corners. A LF through RR low-pass filtered average wheel velocity signals may be treated as signed, 16-bit numbers with a range of +/−2.0 meters per second (m/s).

The LPF may be implemented using the transfer function:

$$H_{(z)} = \frac{A_1}{1 - (1 - A_1)z^{-1}}$$

where $H_{(z)}$ may be a discrete, or 'z', domain transfer function relating the z-transform of the filter output to that of the filter input, and $A_1$ may be a EEPROM Low-Pass Filter calibration. A preferred embodiment of the invention may implement the low-pass filter transfer function by using 16-bit operands as $Y_k=(1-A_1)Y(k-1)+A_1X_k$, where $A_1$=16-bit fractional (Q15) filter constant, $Y_k$=filter output, $Y(k-1)$=previous filter output, and $X_k$=filter input.

All arithmetic steps in the execution of the low-pass filter can be checked for overflow conditions, with saturation forced as appropriate. Further, the arithmetic steps may be sequenced such that intermediate variables are not allowed to clip at either limit. Another embodiment of the invention allows the filter storage element(s) to be 16-bit quantities. Alternative embodiments may use lower precision, or higher precision (32-bit) storage for the filter storage element(s).

The low-pass filtered relative velocities can be subjected to a first or second order infinite impulse response (IIR), digital high-pass filter (HPF) as a second step in determining the average wheel velocity signals 275. Within one embodiment of the invention, this operation may be performed separately for each of the four corners.

The LF through RR band-pass filtered average wheel velocity signals can be treated for another embodiment of the invention, as signed 16-bit numbers with a range of ±2.0 meters per second (m/s). Further, the equation for the high-pass filter may be the same as previously used for the relative velocity high-pass filter 260.

The band-pass filtered relative velocity signals 235 may be used for the rectification process 250. The absolute value of the band-pass filtered relative velocity signals 235 can be used to get the LF through RR rectified wheel velocity signals (rectified wheel velocity signals) 255. The rectified wheel velocity signals 255 can for one embodiment, be treated as signed 16-bit numbers with a range of 0 to +2.0 meters per second (m/s). Further, the rectified wheel velocity signals 255 may be used by a low-pass filtering operation 270.

Within one embodiment of the invention, the rectified wheel velocity signals 255 can be subjected to the low-pass filtering operation 270 of single-pole, infinite impulse response (IIR), and/or digital low-pass filter (LPF) as the final step in determining the average wheel velocity signals 275. The low-pass filtering operation 270 may be performed separately for each of the four corners LF, RF, LR and RR. The resultant LF through RR Average Wheel Velocity signals 275 may be, for one embodiment of the invention, signed 16-bit numbers with a range of ±2.0 meters per second (m/s).

For one embodiment of the invention, the low-pass filtering operation 270 can be implemented using the transfer function:

$$H_{(z)} = \frac{A_1}{1 - (1 - A_1)z^{-1}}$$

where $H_{(z)}$ may be a discrete, or 'z', domain transfer function relating the z-transform of the filter output to that of the filter input, and $A_1$ may be a EEPROM Low-Pass Filter calibration.

A further embodiment of the invention may implement the low-pass filter transfer function by using 16-bit operands as $Y_k=(1-A_1)Y(k-1)+A_1X_k$, where $A_1$=16-bit fractional (Q15) filter constant, $Y_k$=filter output, $Y(k-1)$=previous filter output, and $X_k$=filter input.

All arithmetic steps in the execution of the low-pass filter operation 270 can be checked for overflow conditions with saturation forced as appropriate. Further, the arithmetic steps may be sequenced such that intermediate variables are not allowed to clip at either limit. Another embodiment of the invention may allow the filter storage element(s) to be 16-bit quantities. Alternative embodiments may use lower precision, or higher precision (32-bit) storage for the filter storage element(s).

Figure 3:
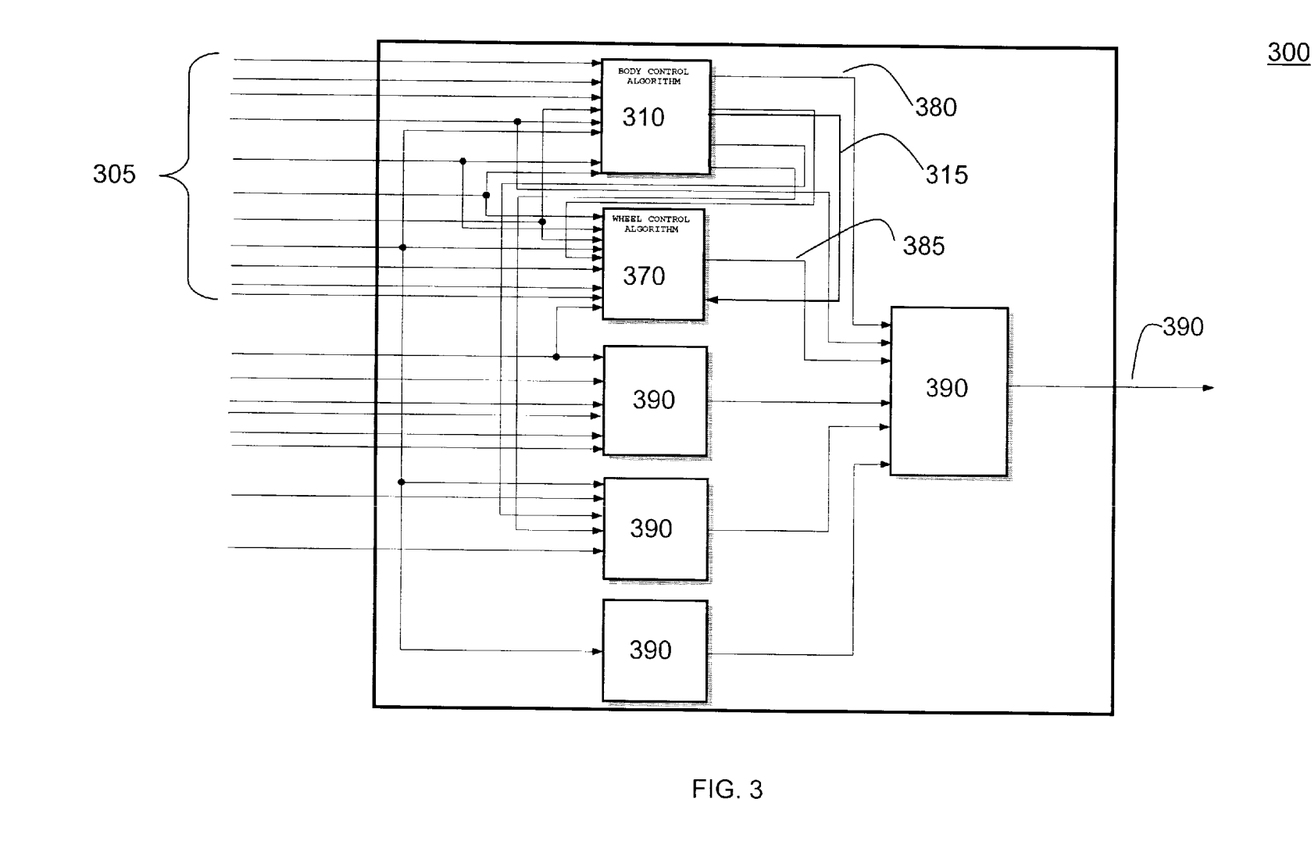
FIG. 3 is a block diagram of one embodiment of a continuously variable real-time damping automatic control algorithm in accordance with the invention.

The outputs LF through RR high-pass filtered relative velocity signals 265, the average wheel velocity signals 275, the band-pass filtered relative velocity signals 235, and all other outputs of the analog signal conditioning algorithm 200, may be provided as inputs to the automatic control algorithm 170, as described in FIG. 3.

FIG. 3 illustrates the flow of processing within an embodiment of a continuously variable real-time damping automatic control algorithm (automatic control algorithm) 300. One embodiment of the automatic control algorithm 300 may be broken down into distinct functional blocks, or modules. A body control algorithm module (body control algorithm) 310, a wheel control algorithm module (wheel control algorithm) 370, and an automatic PWM duty cycle determination module 392 may host a mode of operation for at least one embodiment of the invention.

Input signals 305 to the automatic control algorithm 300, shown at the left-hand side of FIG. 3, include the FIG. 2 average wheel velocity signals 275, the LF through RR high-pass filtered relative velocity signals 265, and the filtered relative velocity signals 235. All the input signals 305 are connected only to the modules that require them. Output signals from the automatic control algorithm 300 and its modules are shown along the right-hand side of FIG. 3. Internally, one embodiment of the invention further provides output data 315 from the body control algorithm 310 as input to the wheel control algorithm 370 providing interconnectivity. The modular approach of FIG. 3 may use software to provide the functionality within each block or module. This is one possible approach for the implementation of the automatic control algorithm 300. Alternative embodiments of the invention may incorporate various names and configurations for the automatic control algorithm 300, while maintaining the described methods for the invention.

The body control algorithm 310 may be defined as the software tasks that lead to the development of a set of four body PWM values (body PWM signals or body damper commands) 380, one each for a left front to right rear (LF-RR) dampers. The wheel control algorithm 370, may be defined as the software tasks that lead to the development of a set of four wheel PWM values (wheel PWM signals or wheel damper commands) 385, one each for the left forward to right rear dampers. The automatic PWM duty cycle determination 392 may determine an automatic PWM duty cycle 395 for each corner. Though determining the final automatic PWM duty cycles for each corner can be used by alternative embodiments, the final automatic PWM duty cycles can be described here with reference to the wheel PWM signals 385.

The automatic mode PWM duty cycle determination module 392 can provide a default PWM floor value for the front and rear corners for an electronic adjustment of a minimum, or 'low-level' damping curves which may apply when elevated PWM levels are not required. In the embodiment of FIG. 3, a default PWM floor value may be provided as a single calibration value 394, which may optionally be different for front and rear corners, and may be altered based upon external commands such as a driver input switch.

The automatic mode PWM duty cycle determination module 392 can determine the automatic PWM duty cycle (automatic damper command) for each corner by selecting the largest of an applicable PWM floor, body PWM and wheel PWM values. Additionally, if other algorithm blocks are used, for example for stability and handling or for electronic bumpstops, the associated PWM outputs may be similarly used as minimum values for the automatic PWM outputs.

The corner PWM duty cycle determination for one embodiment of the invention, can be calculated using the following equations and logic, or equivalent:

DO For Front Corners (xx=LF or RF)
   xx Automatic PWM=MAX (xx Body PWM, xx Wheel PWM, Default Front Floor)
End DO
DO For Rear Corners (xx=LR or RR)
   xx Automatic PWM=MAX (xx Body PWM, xx Wheel PWM, Default Rear Floor)
End DO.

Thus the automatic PWM duty cycle 210 of FIG. 2, can be determined incorporating the wheel PWM 385. This embodiment of the automatic PWM duty cycle 210 may provide an improved wheel hop control while maintaining the desired level of body motion control. The automatic control algorithm 300 of FIG. 3 may further contain blocks or modules 390 detailed in the previously referenced patents or may be outside the scope of the present invention.

Figure 4:
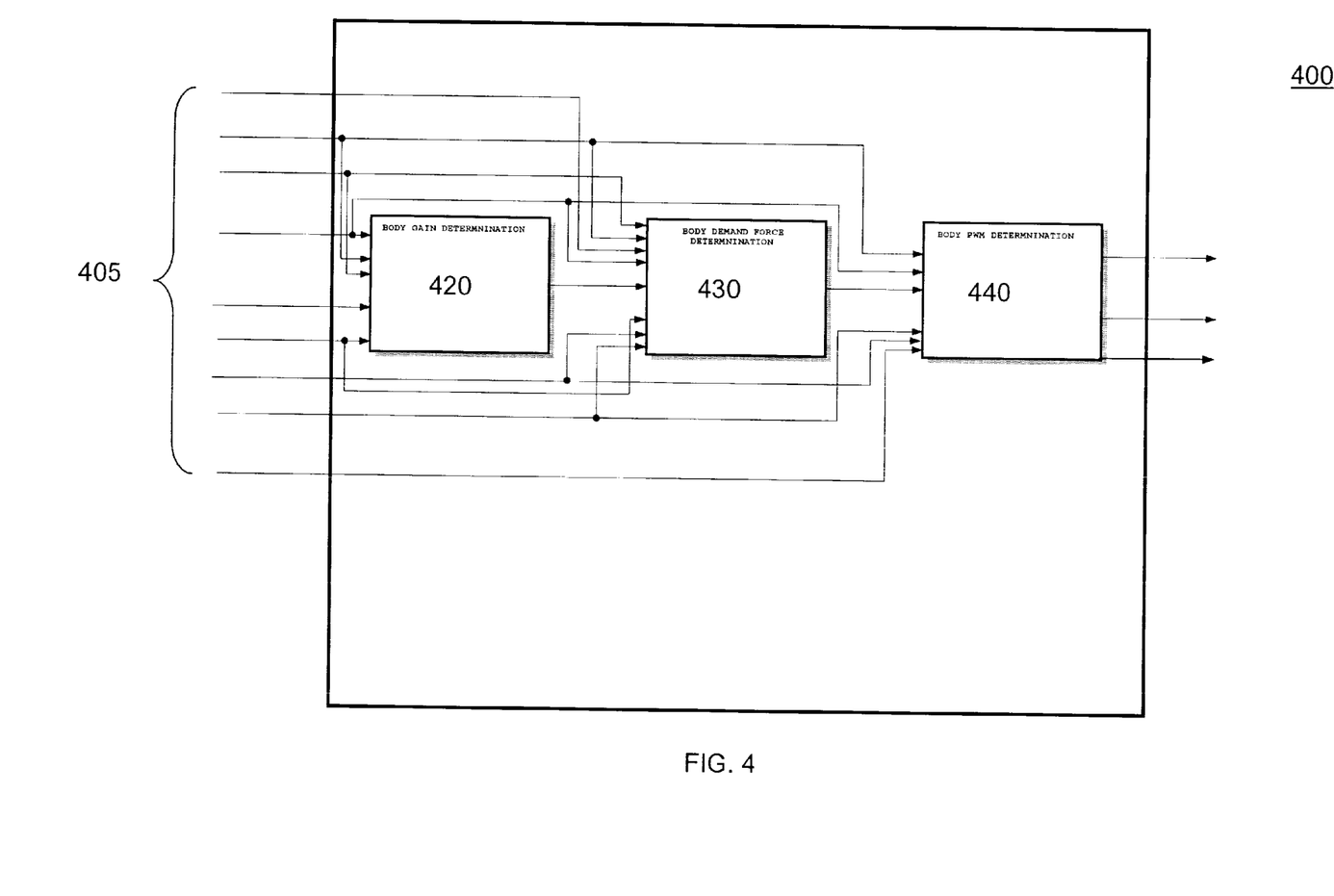
FIG. 4 is a block diagram of one embodiment of a body control algorithm imbedded in the continuously variable real-time damping automatic control algorithm of FIG. 3.

FIG. 4 illustrates a more detailed description of body control algorithm 310 as a body control algorithm module (body control algorithm) 400. Numerous body control algorithm variants known in the art may be used with different embodiments of the body control algorithm 400. A preferred embodiment may involve usage of a "skyhook" body control algorithm which includes one or more gain determination sections, a demand force determination responsive to the determined gains and responsive to one or more measures or estimates of body velocity, and a damper command determination responsive to the determined demand forces and the damper velocities at each corner. The determination of body command signals includes a determination of "Active Quadrant" situations in which the preferred body control output is zero (or minimum possible) damping. An active quadrant flag may be used as the result of an active quadrant determination, to indicate an active (flag on, positive or present) or passive (flag off, negative or not-present) quadrant state. As the active quadrant determination relates to an embodiment of the invention, it will be described in more detail in the paragraphs to follow.

Within the body control algorithm module 400, are a body gain determination module 420, a body demand force determination module 430, and a body PWM determination (body PWM determination module) 440. Inputs 405 for the body control algorithm module 400 are a subset of the previously mentioned inputs 305, and are connected only to the modules that require them. The detail descriptions for the body gain determination module 420 and the body demand force determination module 430 of the body control algorithm module 400 may be found in the previously referenced patents. The resulting body demand forces can be determined based upon a weighted combination of the modal (heave, roll and pitch) velocities. An alternative embodiment may determine the resulting body demand forces based on body motion indicating parameters other then modal velocities. Further, a body demand force power signals may be computed as product of the body demand forces and relative velocity signals.

Figure 5:
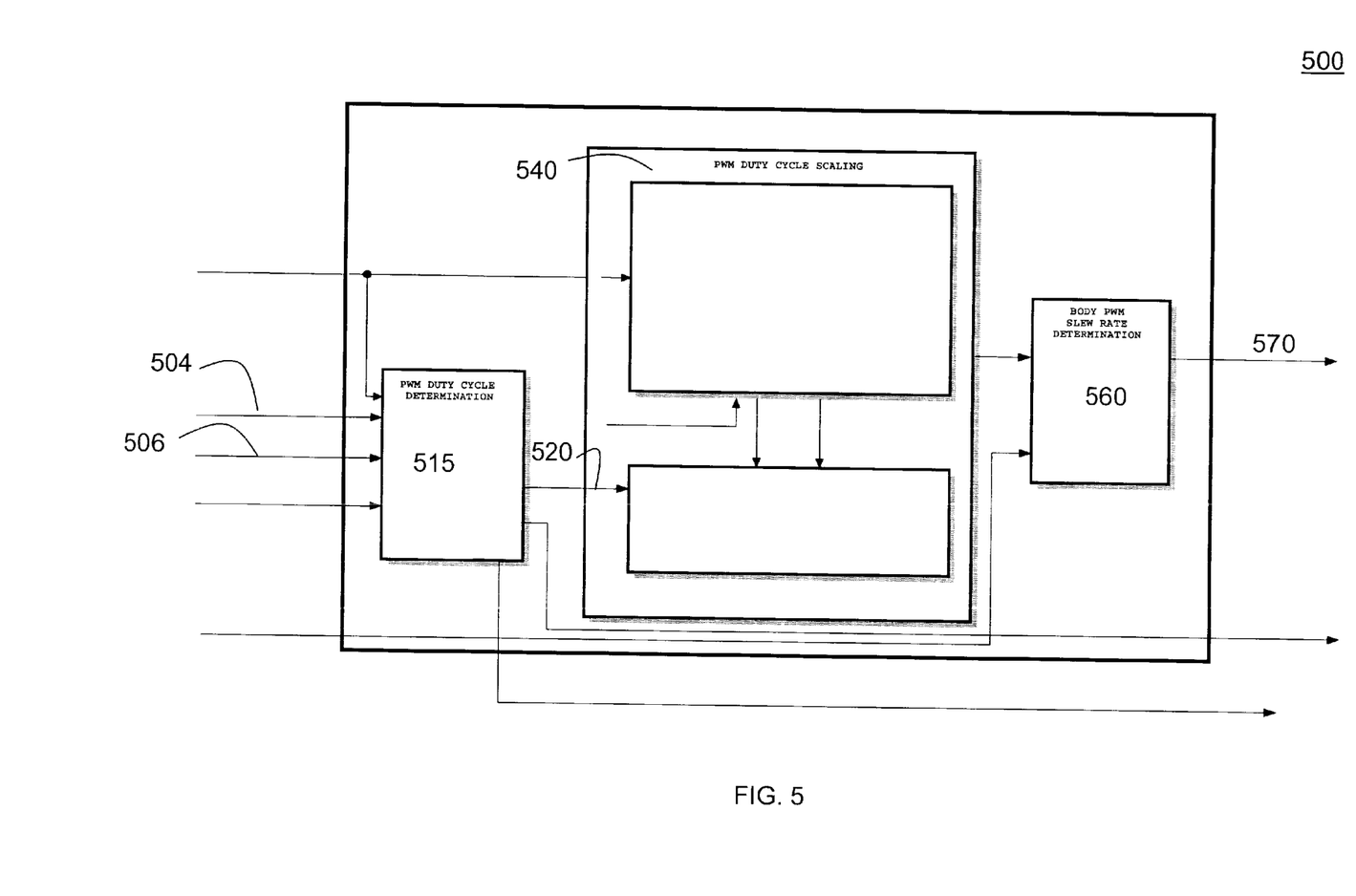
FIG. 5 is a block diagram of one embodiment of a body pulse width modulation determination algorithm imbedded in the body. control algorithm of FIG. 4.

The body PWM determination module 440 may be broken down into functional blocks, or modules, and FIG. 5 illustrates the body PWM determination module 440 in finer detail.

The FIG. 5 block diagram of the body PWM determination module 500 illustrates one embodiment of the internal modules used to provide a body PWM signal (body damper command) 570. The modules include a raw body PWM determination 515, a body PWM scaling 540, and a body PWM slew rate determination 560. For one embodiment of the invention, the raw body PWM determination 515 can be determined from a body demand forces 504 input, a high-pass filtered relative velocity signal 506 (265 in FIG. 2) input, and a set of EEPROM calibrations known as a front and rear damper force tables. The output of the raw body PWM determination 515 may provide a raw body PWM signal 520, and may supply this as an input to the body PWM scaling 540. The body PWM scaling 540 and the body PWM slew rate determination 560 may be used within the application of an embodiment of the invention, and are detailed in the previously referenced patents. One embodiment of the invention may reside within the raw body PWM determination 515 and is illustrated in greater detail in FIG. 6.

Figure 6:
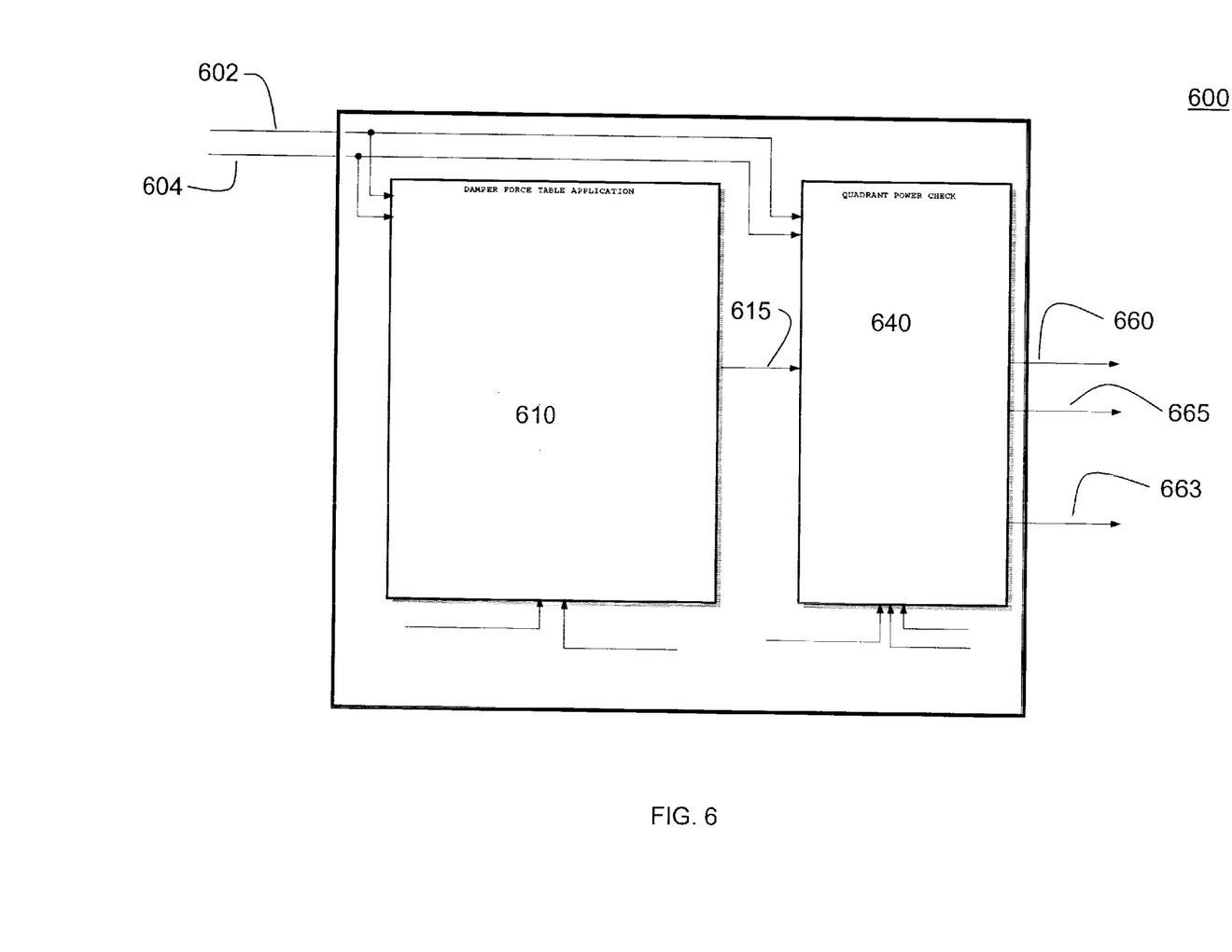
FIG. 6 is a block diagram of one embodiment of a raw body pulse width modulation duty cycle determination algorithm imbedded in the body pulse width modulation determination algorithm of FIG. 5.

FIG. 6 is a block diagram of one embodiment of a raw body PWM determination 600, illustrating a damper force table application 610, and a quadrant power check algorithm 640. Also illustrated are the high-pass filtered relative velocity inputs 506 the body demand forces inputs 504, with raw body PWM outputs 520, body PWM noquad outputs 663, and active quadrant flag outputs 665. The internal flow of information through individual modules can be provided by a raw body PWM input/output 615. The damper force table application 610 may be found within the previously referenced patents, and one embodiment of the invention may reside within the quadrant power check algorithm 640.

The quadrant power check algorithm 640 may perform a quadrant power check individually for each corner of a vehicle, based on the sign/direction of the associated high-pass filtered relative velocity 506 and body demand force 504 signals. The quadrant power check can determine whether the raw body PWM signal for an affected corner should be forced to a minimum value, based upon detection of an 'active' quadrant, which typically indicates that the desired force is opposite in sign to the relative velocity. The CVRTD Control Algorithm 100 embodiment (FIG. 1) of the invention may require the use of only passive suspension dampers known in the art. Passive suspension dampers by definition can only dissipate energy, therefore the best response to the detection of an active quadrant may be to assume a full soft (lowest damping) mode. This may be achieved by bypassing the damper force table application 610 and setting a variable PWM value within the quadrant power check algorithm 640 to a minimum value.

In one embodiment of the invention, the result of the quadrant power check algorithm 640 may be a post-process to the creation of raw body PWM signals created in an earlier algorithm. Further embodiments of the invention may require the input signals to the quadrant power check algorithm 640, be overwritten as necessary based on active quadrant detection. The quadrant power check algorithm 640 may additionally create a set of signals, hereafter referred to as "body PWM noquad" 663, which are equivalent to the raw body PWM signals 520, with the exception that the body PWM noquad 663 may not be forced to a minimum level during active quadrant situations. The body PWM noquad 663 signals may be necessary to support alternative embodiments of the invention yet to be described.

Two separate embodiments for performing the quadrant power check may be selectable based on a function enable calibration flag. Both embodiments may provide the ability to ignore selected active quadrant conditions in order to reduce the effects of phase inaccuracy in the input signals.

The first embodiment of the quadrant power check algorithm 640 may be implemented using the following equations and logic, or equivalent:

```
DO for ALL Corners (xx=LF through RR)
    If (xx Body DF>0) then
        If (xx High-Pass Filtered Relative Velocity+RVDB)
            <0 then
            xx Active Quadrant Flag=Active
        Else
            xx Active Quadrant Flag=Passive
        Endif
    Else
        If (xx High-Pass Filtered Relative Velocity-RVDB)
            >0 then
            xx Active Quadrant Flag=Active
        Else
            xx Active Quadrant Flag=Passive
        Endif
    Endif
End DO
```

Within the first embodiment, RVDB may comprise a pre-defined calibration constant which defines a range of relative velocity values within which the active quadrant flag, or equivalent, is always set to the passive level.

The second embodiment of the quadrant power check algorithm 640 may be implemented using the following equations and logic, or equivalent:

```
DO for ALL Corners (xx=LF through RR)
    If (xx Body DF Power<Power Active OSP) then
        xx Active Quadrant Flag=Active
    Elseif (xx Body DF Power>Power Active ISP)
        xx Active Quadrant Flag=Passive
    Endif
End DO
```

Within this embodiment, the left front (LF) through right rear (RR) body demand force power (Body DF Power) signals, or equivalent, may first be computed as the product of the corresponding body demand force (Body DF) and high-pass filtered relative velocity signals. Power Active OSP and Power Active ISP may comprise pre-defined calibration constants that provide optional hysteresis in the determination of the active quadrant flags.

For one embodiment of the invention, the LF through RR active quadrant flags may be subsequently used with either of the above-mentioned embodiments, when active, to force the associated body damper command to the minimum level using the following equations and logic, or equivalent:

```
DO for ALL Corners (xx=LF through RR)
    xx Body PWM Noquad=xx Raw Body PWM
    If (xx Active Quadrant Flag=Active) then
        xx Raw Body PWM=0
    Endif
End DO
```

Figure 7:
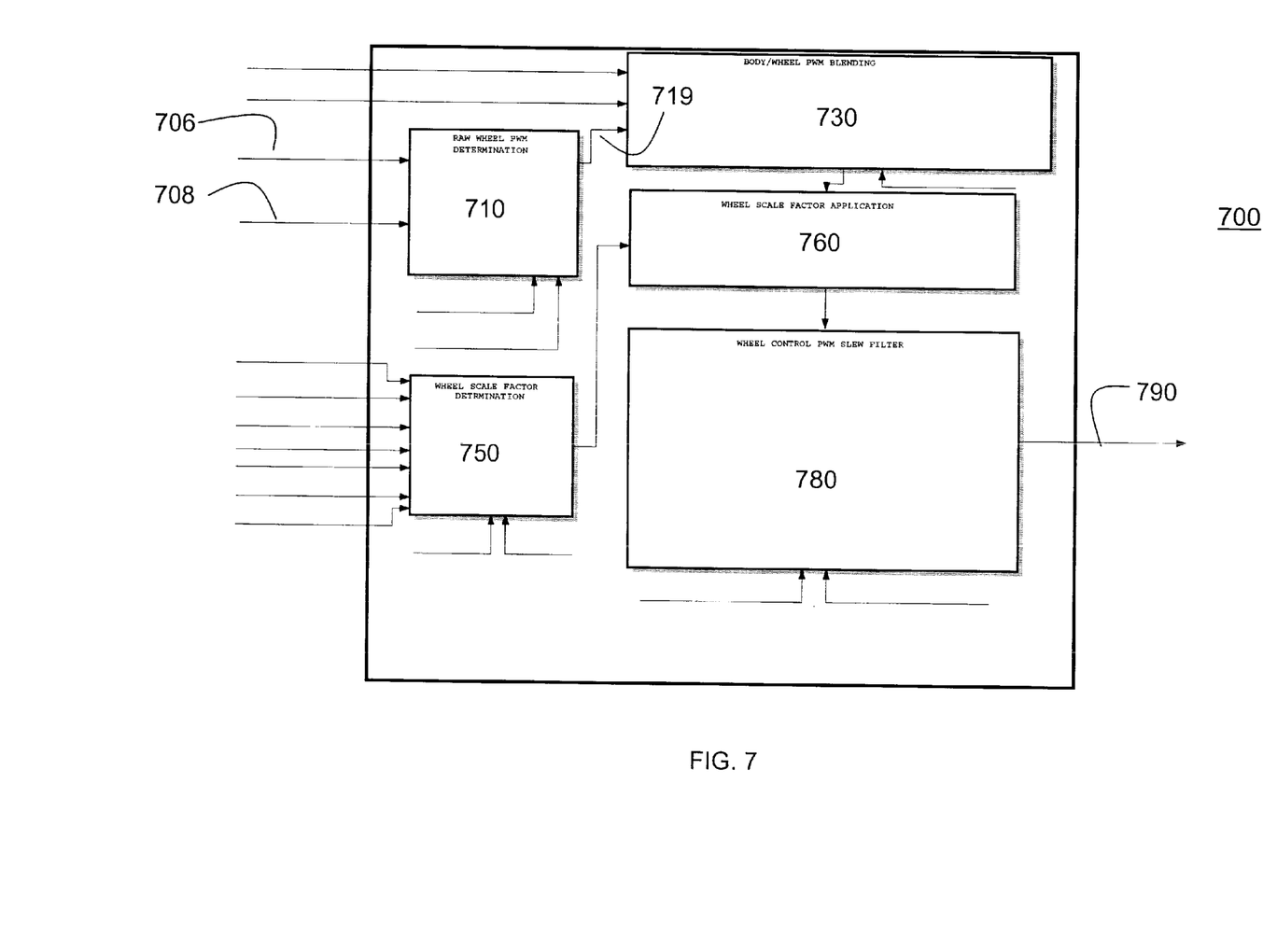
FIG. 7 is a block diagram of one embodiment of a wheel control algorithm imbedded in the continuously variable real-time damping automatic control algorithm of FIG. 3.

Either quadrant power check algorithm 640 embodiment may first update the active quadrant flag for each corner, and subsequently check this flag to determine whether to overwrite the corresponding raw body PWM signal to the minimum level (0%). Additionally, the body PWM noquad signal 663 may be set equal to the raw body PWM signal 520 for each corner before the raw body PWM signal 520 is optionally forced to zero. The output from the completed raw body PWM determination 600 leads to the output of a completed body PWM determination 500, and may be used by additional embodiments of the invention, specifically, within the wheel control algorithm 370. The raw body PWM signal and body PWM noquad signal may be additionally referred to as first and second body damper command signals, respectively, and may be further processed as detailed in the previously referenced patents.

The embodiment of the wheel control algorithm 700, shown in FIG. 7, may contain a raw wheel PWM determination 710, a body/wheel PWM blending 730, a wheel scale factor determination 750, a wheel scale factor application 760, and a wheel PWM slew rate limitation 780. The wheel scale factor determination 750 and wheel scale factor application 760 may be described within the previously referenced patents.

One embodiment of the raw wheel PWM determination 710 may compute a set of four raw wheel PWM signals using a 'passive wheel curve' mapping of predefined desired PWM values versus high-pass filtered relative velocity 706 or band-pass filter relative velocity 708 input values. This may be done by using a lookup-table function that may use the passive wheel curve as a look-up table, with one embodiment of the invention using linear interpolation between points. An additional embodiment may determine which inputs to be used, by the status of a calibration function enable flag.

An additional embodiment of the invention may compute the raw wheel PWM for each corner 719 by using the corresponding high-pass filtered relative velocity 706 as an input to a supplied (Front vs. Rear) 24-point passive wheel curve PWM table. Various methods can be used to perform this function but one embodiment of the invention may suggest a mathematical implementation, which may take advantage of the regimented relative velocity (RV) spacing in order to streamline a table look-up and interpolation process. The mathematical implementation called 'passive wheel curve input flag calibration', may dictate the signals used as inputs to the passive wheel curve function, according to the following equations and logic, or equivalent:

If Passive Wheel Curve Input Flag=1 then
    LF→RR PWC RV=LF→RR BPF RV
Else
    LF→RR PWC RV=LF→RR HPF RV
Endif The first 'if' statement may provide the band-pass filter velocity 708 as input, while the 'else' statement may provide the high-pass filter velocity 706 as input.

Two different look-up table implementation options may be used, an inherent interpolation option, and a standard table look-up and interpolation option. An embodiment of the invention may use the inherent interpolation option and may improve throughput, but at the expense of additional programming code size and complexity being required to provide its functionality. An embodiment using the standard table look-up and interpolation option may minimize code complexity and allow more flexibility in the selection of the x-axis (relative velocity) indices.

For the embodiment using the inherent interpolation option, the rebound and compression portions of the front and rear passive wheel curve look-up tables may be structured in a manner to streamline the execution time for the table look-up and interpolation operations while allowing for the desired tuning flexibility. The front and rear passive wheel curve look-up table structures may be as indicated in the table:

| LABEL | RV (m/s) | RV (CU) | PWM Value |
|---|---|---|---|
| Address0 | 0 | 0000 0000 0000 0000 | PWM0 |
|  | 0.0625 | 0000 0100 0000 0000 | PWM1 |
| Address2 | 0.125 | 0000 1000 0000 0000 | PWM2 |
|  | 0.25 | 0001 0000 0000 0000 | PWM3 |
|  | 0.375 | 0001 1000 0000 0000 | PWM4 |
| Address5 | 0.5 | 0010 0000 0000 0000 | PWM5 |
|  | 0.75 | 0011 0000 0000 0000 | PWM6 |
|  | 1.0 | 0100 0000 0000 0000 | PWM7 |
|  | 1.25 | 0101 0000 0000 0000 | PWM8 |
|  | 1.5 | 0110 0000 0000 0000 | PWM9 |
|  | 1.75 | 0111 0000 0000 0000 | PWM10 |
|  | 2.0 | N/A (Overflow) | PWM11 |

Within the binary RV definition, the bits that are shaded and in bold type illustrate the inherent table index for each of the 0.0625, 0.125 m/s or 0.25 m/s look-up table steps. In addition, the following equations and logic, or equivalent, are suggested for the inherent interpolation option:

DO for ALL Corners (xx=LF through RR)
  If FRONT Corner (xx=LF OR RF) then
    If xx Passive Wheel Curve Relative Velocity (PWC RV)>0 then
    PWC Table Pointer (Temp)=REBOUND (+RV) portion of Front PWC Table
    Else
    PWC Table Pointer (Temp)=COMPRESSION (−RV) portion of Front PWC Table
  Endif
  Else
    If xx Passive Wheel Curve Relative Velocity (PWC RV)>0 then
    PWC Table Pointer (Temp)=REBOUND (+RV) portion of Rear PWC Table
    Else
    PWC Table Pointer (Temp)=COMPRESSION (−RV) portion of Rear PWC Table
  Endif
Endif
RV (Temp)=|xx PWC RV|
If RV <0.125 then
  Table Index (Pointer to Y1)=RV <11-10> (10 shifts to the right)
  Y1=Value @ Address 0+Table Index
  Y2=Value @ Address 0+Table Index+1
  Delta X=RV <9-0> (Arithmetic shift left 6 times)
Interpolate Using Equation: Y (xx Raw Wheel PWM)=Y1+ (Y2−Y1) * Delta X
Elseif RV <0.5 then
  Table Index (Pointer to Y1)=RV <13-11> (11 shifts to the right)−1
  Y1=Value @ Address 2+Table Index
  Y2=Value @ Address 2+Table Index+1
  Delta X=RV <10-0> (Arithmetic shift left 5 times)
Interpolate Using Equation: Y (xx Raw Wheel PWM)=Y1+ (Y2−Y1) * Delta X
Else
  Table Index (Pointer to Y1)=RV <14-12> (12 shifts to the right)−2
  Y1=Value @ Address 5+Table Index
  Y2=Value @ Address 5+Table Index+1
  Delta X=RV <11-0> (Arithmetic shift left 4 times)

Interpolate Using Equation: Y (xx Raw Wheel PWM)=
    Y1+(Y2−Y1) * Delta X
Endif
End DO In each of the above interpolation steps, the left shift operations used to determine the Delta X value can additionally provide inherent multiplication operations. For example, in the RV <0.125 m/s region, the RV is shifted left 6 times to strip out the unwanted data bits, while effectively multiplying the remaining quantity by $2^6$=64. The multiplication by 64 thus inherently shows up in the computation of the Raw Wheel PWM value, and accounts for the following factors:

1/0.0.0625=16

Extra sign bit after multiplication (canceled via multiplication by 2)

RV signal range of +/−2 (canceled via multiplication by 2)

Further, the left shift operations may be of the arithmetic (versus logical) type, in order to preserve the sign bit. Additionally, the search operation to determine the RV range (<0.125, between 0.125 and 0.5, OR greater than 0.5) may be done using shift operations.

If the second look-up table implementation option, a standard table look-up and interpolation option, it may be possible to adjust the location of relative velocity indices without significantly impacting programming code or its loop processing time (loop-time). Accordingly, with this option the rebound and compression portions of the front and rear passive wheel curve look-up tables may be structured as indicated in the table below:

| LABEL    | RV (m/s) | RV (CU)             | PWM Value |
|----------|----------|---------------------|-----------|
| Address0 | 0        | 0000 0000 0000 0000 | PWM0      |
| Address1 | 0.05     | 0000 0011 0011 0011 | PWM1      |
| Address2 | 0.1      | 0000 0110 0110 0110 | PWM2      |
|          | 0.2      | 0000 1100 1100 1100 | PWM3      |
|          | 0.35     | 0001 0110 0110 0110 | PWM4      |
| Address5 | 0.5      | 0010 0000 0000 0000 | PWM5      |
|          | 0.75     | 0011 0000 0000 0000 | PWM6      |
|          | 1.0      | 0100 0000 0000 0000 | PWM7      |
|          | 1.25     | 0101 0000 0000 0000 | PWM8      |
|          | 1.5      | 0110 0000 0000 0000 | PWM9      |
|          | 1.75     | 0111 0000 0000 0000 | PWM10     |
|          | 2.0      | N/A (Overflow)      | PWM11     | where the values indicated in bold type differ from those shown in the Inherent Interpolation option. With this option, The following equations and logic, or equivalent, are suggested:
DO for ALL Corners (xx=LF through RR)
  If FRONT Corner (xx=LF OR RF) then
    If xx Passive Wheel Curve Relative Velocity (PWC RV)>0 then
    PWC Table Pointer (Temp)=REBOUND (+RV) portion of Front PWC Table
    Else
    PWC Table Pointer (Temp)=COMPRESSION (−RV) portion of Front PWC Table
    Endif
  Else
    If xx Passive Wheel Curve Relative Velocity (PWC RV) >0 then
    PWC Table Pointer (Temp)=REBOUND (+RV) portion of Rear PWC Table
    Else
    PWC Table Pointer (Temp)=COMPRESSION (−RV) portion of Rear PWC Table
    Endif
  Endif
  RV (Temp)=|xx PWC RV|
  k=0;
  While (RV >RV Table(k))
    k=k+1
  Endwhile
  xx Raw Wheel PWM=PWC Table(k−1)+[PWC Table(k)−PWC Table(k−1)] * [(|RV|−RV Table(k−1))/(RV Table(k)−RV Table(k−1))]
End DO In order to minimize loop-time impacts, the divisions used in the interpolation equations for this embodiment, may preferably be computed at calibration upload, rather than each control loop. In addition, further embodiments of the invention may utilize a binary table look-up, and may be preferable from a throughput perspective. Regardless of which option table look-up option is completed, its output may be provided to the body/wheel PWM blending algorithm as the raw wheel PWM signals 719.

The body/wheel blending algorithm 730 can create a set of "blended" wheel PWM signals (second wheel command) by post-processing the raw wheel PWM signals (supplied wheel command) 719 based upon the status of the body control algorithms 400 commands at the corresponding corners. More particularly, the "blended" wheel PWM signals may optionally be reduced in magnitude, relative to the raw wheel PWM signals 719, whenever the active quadrant flag (body control active quadrant flag) 665 and the body PWM noquad values 663 are active (as described in FIG. 6). The goal for the body/wheel blending algorithm 730 may be to improve the level of body motion control by reducing the damping contribution from the wheel control algorithm 700 during situations when the body control algorithm 400 would prefer to have "active" power, which can be best approximated in the semi-active case by commanding minimum damping. One embodiment of the invention may determine the blended wheel PWM using the following logic, or equivalent:
DO for ALL Corners (xx=LF through RR)
  If (xx Active Quadrant Flag==Active) then
    xx Blended Wheel PWM=xx Raw Wheel PWM−AQSF * xx Body PWM Noquad
    If (xx Blended Wheel PWM<0) then
      xx Blended Wheel PWM=0
    Endif
  Endif
End DO After the raw wheel PWM signal 719 is processed by the body/wheel PWM blending 730, the blended signal may be further processed by the wheel scale factor determination 750, and the wheel scale factor application 760 before reaching the wheel PWM slew rate limitation 780.

The scaled wheel PWM for each corner of a vehicle may be independently subjected to the wheel PWM slew rate limitation algorithm 780 in order to generate the wheel PWM values 790 (385 in FIG. 3) for each corner.

Within one embodiment of the invention, the slew rate limitation can be defined as a control placed on the amount by which each 'filtered wheel PWM' is allowed to change, from one control loop to the next. The 'maximum change' allowed by this embodiment may generally be different for upward versus downward changes in the wheel scale factor application 760 output signals. The application for the wheel PWM slew rate limitation 780 may be execute using the following equations and logic, or equivalent:

```
DO for ALL Corners (xx=LF through RR)
    If Front Damper (xx=LF or xx=RF) then
        Increasing Delta=Front Wheel Increasing Delta
        Decreasing Delta=Front Wheel Increasing Delta
    Else
        Increasing Delta=Rear Wheel Increasing Delta
        Decreasing Delta=Rear Wheel Increasing Delta
    Endif
    Delta (Temp)=xx Scaled Wheel PWM-xx Filtered Wheel
        PWM
    If (Delta<=0) then
        If (|Delta|>Decreasing Slew Rate Limit) then
            Delta=-Decreasing Slew Rate Limit
        Endif
    Else
        If (Delta>Increasing Slew Rate Limit) then
            Delta=Increasing Slew Rate Limit
        Endif
    Endif
    xx Filtered Wheel PWM=xx Filtered Wheel PWM+Delta
End DO
```

Thus the filtered wheel PWM values (wheel damper commands) 790 has been determined incorporating the above described embodiments, descriptions, and pseudo-code representations. Additionally, as with all pseudo-code representations included within the detailed description of the invention, the pseudo-code can communicate one of many possible approaches. Any approach may be implemented for additional embodiments provided the functionality is equivalent to that shown and described. Further, the above-described implementations of this invention are example implementations. Moreover, various other improvements and modifications to this invention may occur to those skilled in the art and those improvements and modifications will fall within the scope of this invention as set forth by the claims below.

We claim:

1. A method for controlling a variable force damper system, comprising:

receiving at least one relative velocity signal;

receiving at least one body demand force;

determining at least one body damper command based on the body demand force;

determining at least one wheel motion indicating parameter based on the relative velocity signal;

determining at least one wheel damper command based on the wheel motion indicating parameter; and determining a damper command based on the larger of the body damper command and the wheel damper command.

2. The method of claim 1 wherein the relative velocity signal is a function of a wheel and a corresponding corner of a vehicle body.

3. The method of claim 1 wherein the wheel motion indicating parameter is determined using a wheel frequency isolation filter.

4. The method of claim 3 wherein the wheel frequency isolation filter comprises a digital band-pass filter.

5. The method of claim 4 wherein the digital band-pass filter comprises a low-pass filter, and a high-pass filter.

6. The method of claim 1 further comprising applying a slew rate limit to the wheel damper command.

7. The method of claim 1 wherein the wheel damper command is determined by a lookup-table function.

8. The method of claim 7 wherein the lookup-table function is based on a linear interpolation function.

9. The method of claim 7 wherein the lookup-table function is based on a standard interpolation function.

10. The method of claim 7 wherein the lookup-table function is based on an inherent interpolation function.

11. A method for controlling a variable force damper system, comprising:

determining an active quadrant flag based on a supplied body demand force and a supplied relative velocity signal wherein the active quadrant flag may be active or passive;

determining a first body damper command based on the supplied body demand force;

determining a second body damper command based on the active quadrant flag wherein the second body damper command is equal to zero when the active quadrant flag is active;

determining the second body damper command based on the active quadrant flag wherein the second body damper command is equal to the first body damper command when the active quadrant flag is passive;

determining a second wheel damper command based on the active quadrant flag wherein the second wheel damper command is equal to a function of a supplied wheel damper command and the first body damper command when the active quadrant flag is active; and determining the second wheel damper command based on the active quadrant flag wherein the second wheel damper command is equal to the supplied wheel damper command when the active quadrant flag is passive.

12. The method of claim 11 wherein the determining of the second wheel damper command further comprises:

subtracting the first body damper command multiplied by a pre-defined scaler from the supplied wheel damper command when the active quadrant flag is active; and setting the second wheel damper command to equal zero when the second wheel damper command is less than zero.

13. A method for controlling a variable force damper system, comprising:

receiving at least one relative velocity signal;

receiving at least one body demand force;

determining a body demand force power signal as the product of the body demand force and the relative velocity signal;

determining a body control active quadrant flag responsive to the body demand force power signal wherein the body control active quadrant flag may be active or passive;

determining a body damper command responsive to the body demand force when the body control active quadrant flag is passive, and zero otherwise.

14. The method of claim 13 in which the body control active quadrant flag is set to active when the body demand force signal is less than a first pre-defined value and set to passive when the body demand force power signal is greater than a second pre-defined value.

15. A system for controlling a variable force damper system, comprising:

means for receiving at least one relative velocity signal;

means for receiving at least one body demand force;

means for determining at least one body damper command based on the body demand force;

means for determining at least one wheel motion indicating parameter based on the relative velocity signal;

means for determining at least one wheel damper command based on the wheel motion indicating parameter; and means for determining a damper command based on the larger of the body damper command and the wheel damper command.

16. A system for controlling a variable force damper system, comprising:

means for determining an active quadrant flag based on a supplied body demand force and a supplied relative velocity signal wherein the active quadrant flag may be active or passive;

means for determining a first body damper command based on the supplied body demand force;

means for determining a second body damper command based on the active quadrant flag wherein the second body damper command is equal to zero when the active quadrant flag is active;

means for determining the second body damper command based on the active quadrant flag wherein the second body damper command is equal to the supplied body damper command when the active quadrant flag is passive;

means for determining a second wheel damper command based on the active quadrant flag wherein the second wheel damper command is equal to a function of a supplied wheel damper command and the first body damper command when the active quadrant flag is active; and means for determining the second wheel damper command based on the active quadrant flag wherein the second wheel damper command is equal to the supplied wheel damper command when the active quadrant flag is passive.

17. The system of claim 16 wherein the means for determining the second wheel damper command further comprises:

means for subtracting the first body damper command multiplied by a pre-defined scaler from the first wheel damper command when the active quadrant flag is active; and means for setting the second wheel damper command to equal zero when the second wheel damper command is less than zero.

18. A system for controlling a variable force damper system, comprising:

means for receiving at least one relative velocity signal;

means for receiving at least one body demand force;

means for determining a body demand force power signal as the product of the body demand force and the relative velocity signal;

means for determining a body control active quadrant flag responsive to the body demand force power signal wherein the body control active quadrant flag may be active or passive;

means for determining a body damper command responsive to the body demand force when the body control active quadrant flag is not set, and zero otherwise.

19. A computer readable medium storing a computer program comprising:

computer readable code for receiving at least one relative velocity signal;

computer readable code for receiving at least one body demand force;

computer readable code for determining at least one body damper command based on the body demand force;

computer readable code for determining at least one wheel motion indicating parameter based on the relative velocity signal;

computer readable code for determining at least one wheel damper command based on the wheel motion indicating parameter; and computer readable code for determining a damper command based on the larger of the body damper command and the wheel damper command.

20. A computer readable medium storing a computer program comprising:

computer readable code for determining an active quadrant flag based on a supplied body demand force and a supplied relative velocity signal wherein the active quadrant flag may be active or passive;

computer readable code for determining a first body damper command based on the supplied body demand force;

computer readable code for determining a second body damper command based on the active quadrant flag wherein the second body damper command is equal to zero when the active quadrant flag is active;

computer readable code for determining the second body damper command based on the active quadrant flag wherein the second body damper command is equal to the first body damper command when the active quadrant flag is passive;

computer readable code for determining a second wheel damper command based on the active quadrant flag wherein the second wheel damper command is equal to a function of a supplied wheel damper command and the first body damper command when the active quadrant flag is active; and computer readable code for determining the second wheel damper command based on the active quadrant flag wherein the second wheel damper command is equal to the supplied wheel damper command when the active quadrant flag is passive.

21. The computer readable medium of claim 20 wherein the computer readable code for determining the second wheel damper command further comprises:

computer readable code for subtracting the first body damper command multiplied by a pre-defined scaler from the supplied wheel damper command when the active quadrant flag is active; and computer readable code for setting the second wheel damper command to equal zero when the supplied wheel damper command is less than zero.

22. A computer readable medium storing a computer program comprising:

computer readable code for receiving at least one relative velocity signal;

computer readable code for receiving at least one body demand force;

computer readable code for determining a body demand force power signal as the product of the body demand force and the relative velocity signal;

computer readable code for determining a body control active quadrant flag responsive to the body demand force power signal;

computer readable code for determining a body damper command responsive to the body demand force when the body control active quadrant flag is passive, and zero otherwise.

* * * * *